United States Patent

Engel et al.

[11] Patent Number: 6,019,344
[45] Date of Patent: Feb. 1, 2000

[54] MAGNET ARMATURE

[75] Inventors: Jürgen Engel, Fränkisch-Crumbach; Sebastian Zabeck, Birkenau; Joachim Heinemann, Gorxheimertal, all of Germany

[73] Assignee: Firma Carl Freudenberg, Weinheim, Germany

[21] Appl. No.: 09/207,230

[22] Filed: Dec. 8, 1998

[30] Foreign Application Priority Data

Dec. 9, 1997 [DE] Germany ............................. 197 54 525

[51] Int. Cl.[7] ................................................... F16K 31/06

[52] U.S. Cl. ........................................ 251/64; 251/129.01

[58] Field of Search ................................ 251/64, 129.01, 251/65

[56] References Cited

U.S. PATENT DOCUMENTS

| | | | |
|---|---|---|---|
| 2,812,776 | 11/1957 | Lofftus et al. | 251/129.01 X |
| 5,246,199 | 9/1993 | Numoto et al. | 251/129.15 |
| 5,467,961 | 11/1995 | Sausner et al. | 251/129.15 |
| 5,503,366 | 4/1996 | Zabeck et al. . | |
| 5,544,856 | 8/1996 | King et al. | 251/65 X |
| 5,878,991 | 3/1999 | Krimmer et al. | 251/64 |

*Primary Examiner*—Stephen M. Hepperle
*Assistant Examiner*—John Bastianelli
*Attorney, Agent, or Firm*—Kenyon & Kenyon

[57] ABSTRACT

A magnet armature for an electromagnetically operable valve, having a sealing body which can be brought into engagement with a valve seat to seal against it. The magnet armature has at least one stop buffer made of an elastomeric material arranged on the end of the armature facing away from the sealing body. The stop buffer has a diminishing cross section in the opening direction to achieve a progressive spring characteristic.

10 Claims, 3 Drawing Sheets

MAGNET ARMATURE

BACKGROUND OF THE INVENTION

The present invention concerns a magnet armature for an electromagnetically operable valve, having a sealing body which can be brought into engagement with a valve seat to seal it, with at least one stop buffer made of an elastomeric material arranged on the end facing away from the sealing body.

Such a magnet armature is known from German Patent 43 09 739 A1 (the corresponding U.S. Pat. No. 5,503,366 is incorporated herein by reference). Inside a valve casing there is arranged a toroidal solenoid surrounding peripherally a magnet armature that can move back and forth axially, with the magnet armature being supported elastically by a spring element in the area of its one end face against a magnet armature designed as an abutment. An annular stop buffer is provided on the side of the magnet armature facing away from the sealing body to reduce impact noises in extreme deflection of the relatively movable magnet armature.

SUMMARY OF THE INVENTION

The object of the present invention is to further develop a magnet armature of the aforementioned type so that pulsed noises of the valve are further reduced, and the travel of the magnet armature is varied automatically as a function of pulse width or pulse duty factor.

To achieve this object, the stop buffer has a diminishing cross section in the direction of opening to achieve a progressive spring characteristic. The intensity of the impact noises of a magnet armature on a magnet core bordering it in the direction of opening and/or on the valve seat depends on the forces acting on the magnet armature. These forces may be formed, for example, by the spring force with which a normally closed valve is forced out of its open position and onto the valve seat when the current is cut off, or by the magnetic force which moves the magnet armature in the open direction when energized by current, by hydraulic forces of the medium, e.g., on the valve seat, and/or by frictional forces on the surface of the magnet armature. Furthermore, the intensity of the noise is proportional to the valve lift.

Pulse width modulated (PWM)-driven valves are, in the context of this invention, valves which are driven intermittently. The period, which is defined by the triggering frequency, can be subdivided continuously into "open" and "closed." The pulse duty factor is understood to be the ratio of the opening time to the period.

The height of the stop buffer determines the restriction on the travel of the magnet armature and covers a portion of the total lift range, the total lift being composed of the sum of the free lift and the attenuated lift. The height of the stop nubs corresponds to the attenuated lift. The magnitude of the attenuated lift of PWM-driven solenoid valves is in the range of 1.5 mm.

Providing the stop nubs with a progressive spring characteristic is advantageous, because the force-travel diagram of electromagnetically operable valves is characterized by a progressive increase in force with a decrease in travel/lift. To optimally adapt to this behavior, the stop buffers also have a progressive spring characteristic, so that the stop buffers act with a greater force against the movement of the magnet armature as the spring deflection increases.

Due to the progressive spring characteristic and the design of the stop buffers according to the present invention, a drive-dependent variation in travel is achieved in addition to the purely static attenuation at a constant lift of the valve. In the low pulse duty factor range, the force acting on the magnet armature is lower than that at a high pulse duty factor, which can be seen, for example, by the differences in average power consumption by the solenoid.

The stop buffers are designed so that the magnetic force at a low pulse duty factor is not sufficient to deform the stop buffers to the extent that the rated travel of the magnet armature is achieved completely. The rated travel is reached only at a pulse duty factor of more than about 30%, at a pulse frequency of 10 Hz and at nominal voltage. Above the response threshold of the magnet at a pulse duty factor of about 5% to 30%, the spring characteristic of the stop buffer is such that the travel of the magnet armature between the minimum travel and the rated travel is proportional to the pulse duty factor.

The drive-dependent variation in travel is advantageous in particular when the magnet armature according to the present invention is used in activated carbon filter valves of motor vehicles, for example, to recycle volatile fuel components from the tank system into the intake manifold of an internal combustion engine. The drive-dependent operating range of the magnet is in the near-idling range of the engine, where noise emission by the electromagnetically operable valve is especially critical because the engine is running quietly at a low rpm, while the forces of acceleration on the magnet armature are especially high due to the high intake manifold vacuum.

Another advantage is achieved by the fact that the metering capability of the valve is improved at a reduced travel of the magnet armature. A good metering capability is of crucial importance, especially in the near-idling range of the engine.

If the stop buffer is made of a suitable elastomer, such as fluoropolymers (FPM), the magnet armature will also have a temperature-dependent change in travel due to the stop buffer design according to the present invention. By using such a material, the operation of the valve at low temperatures is influenced to the extent that the lift is less than at higher temperatures because these materials usually harden at temperatures below 0° C. and thus the spring characteristics change. The temperature-dependent change is especially advantageous with activated carbon filter valves, because due to the temperature-dependent reduction in lift at low temperatures, noise is reduced in the entire cold operating range of the engine. However, if the temperature increases in the attenuation range due to the valve being energized, for example, the running noise of the valve will be reduced again due to the fact that the elastomeric material is gradually becoming softer.

According to an advantageous embodiment, at least three nub-shaped stop buffers distributed uniformly in the peripheral direction are provided. Stop buffers designed like nubs with a diminishing cross section in the direction of opening are especially advantageous because their cup shape makes it possible to buffer shocks and thus permits a reduction in force with a time lag as a function of the respective conditions in the given application.

The stop buffers may have a height of 0.1 to 1.5 mm, the height preferably being 0.4 to 0.5 mm in the opening direction. With such a design, it has proven advantageous for the attenuated height to be 0.4 to 0.5 mm and the free height to be 0.1 to 0.2 mm.

A simple stop nub design from the standpoint of manufacturability has a cross section essentially in the form of a truncated pyramid. This makes it especially easy to achieve a progressive spring characteristic. According to a different embodiment, it is also possible to provide stop nubs having a cross section designed essentially as a truncated cone.

It has proven advantageous that the inside surfaces of the stop buffer form an angle of 10° to 45° with an axis arranged in the direction of opening, preferably 20° to 30°. The inside surfaces of the stop buffer are the surfaces which are each arranged on the inside radially when the magnet armature has a rotationally symmetrical shape. An axis arranged in the opening direction corresponds to the axis of symmetry of rotationally symmetrical components. In principle, it is sufficient to arrange one of the faces, for example, in this case the inside surfaces of the stop buffers, at an inclination relative to the axis to obtain a progressive spring characteristic. Different designs where the stop buffers are designed with a conical taper in the direction of opening are also conceivable.

To achieve a stepwise discontinuous attenuation of the magnet armature, the stop buffers may have different heights, with at least three stop buffers of the same height arranged with a uniform distribution in the peripheral direction. The stop buffers of the same height are preferably designed identically. The fact that the stop buffers of each step have the same height prevents tilting of the magnet armature when the nubs come in contact with the magnet core. For manufacturing reasons, the number of steps should be no greater than three. Due to the identical design of the stop buffers of each step, each stop buffer of one step has identical operating characteristics.

The magnet armature is preferably provided with a central passage extending in the opening direction and filled completely with elastomeric material, with the sealing body and the stop buffers designed in one piece, with a smooth transition between them, and made of the same material. It is advantageous here that the magnet armature can be manufactured especially easily and inexpensively. Both the sealing body and the stop buffers are attached to the metallic material of the magnet armature in a single operation.

BRIEF DESCRIPTION OF THE DRAWINGS

The magnet armature according to the present invention is explained in greater detail below in the following schematic illustrations of an embodiment of the invention constructed according to the principles of the invention.

DETAILED DESCRIPTION OF THE INVENTION

Figure 1:
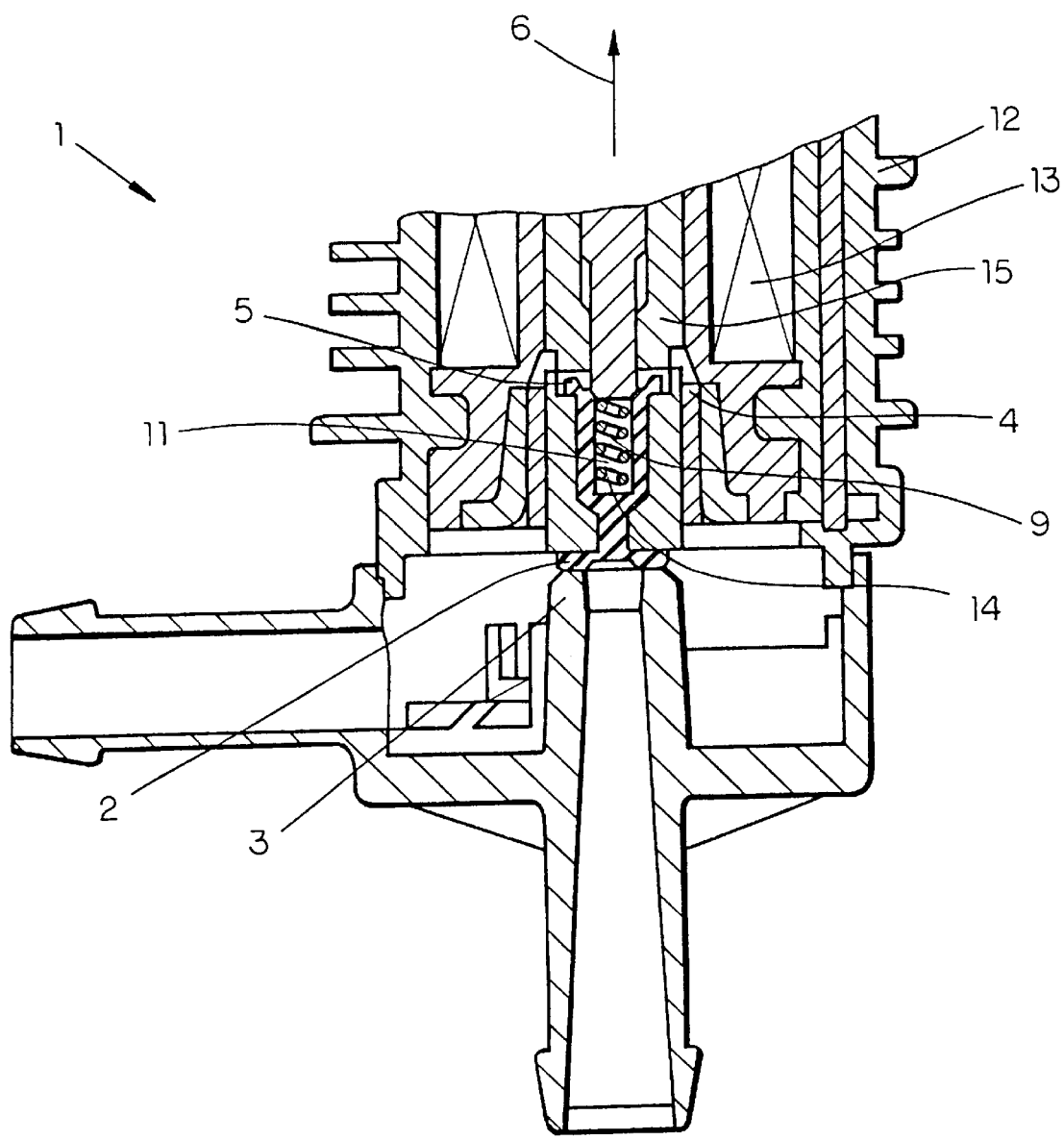
FIG. 1 is a cross-sectional view of a portion of an electromagnetically operable valve in which a magnet armature of the present invention is used.

FIG. 1 shows in detail a cross section of a portion of an electromagnetically operable valve 1, having an annular solenoid 13 arranged in a casing 12 surrounding the magnet armature which is made of a metallic material and can move back and forth axially. The magnet armature is connected to a sealing body 2 made of an elastomeric material contacting valve seat 3 to form a seal in the non-energized state illustrated here. The magnet armature is pressed against valve seat 3 by its inherent weight and by the force of spring 14.

In this embodiment, four stop buffers 5 made of an elastomeric material with a diminishing cross section in opening direction 6 to achieve a progressive spring characteristic are arranged so that they are uniformly distributed in the peripheral direction on end face 4 of the magnet armature facing away from sealing body 2. When solenoid 13 is energized, the magnet armature moves in opening direction 6, lifts up from valve seat 3 and comes in contact with magnet core 15, thereby compressing springs 14 with its stop buffers 5.

Figure 2:
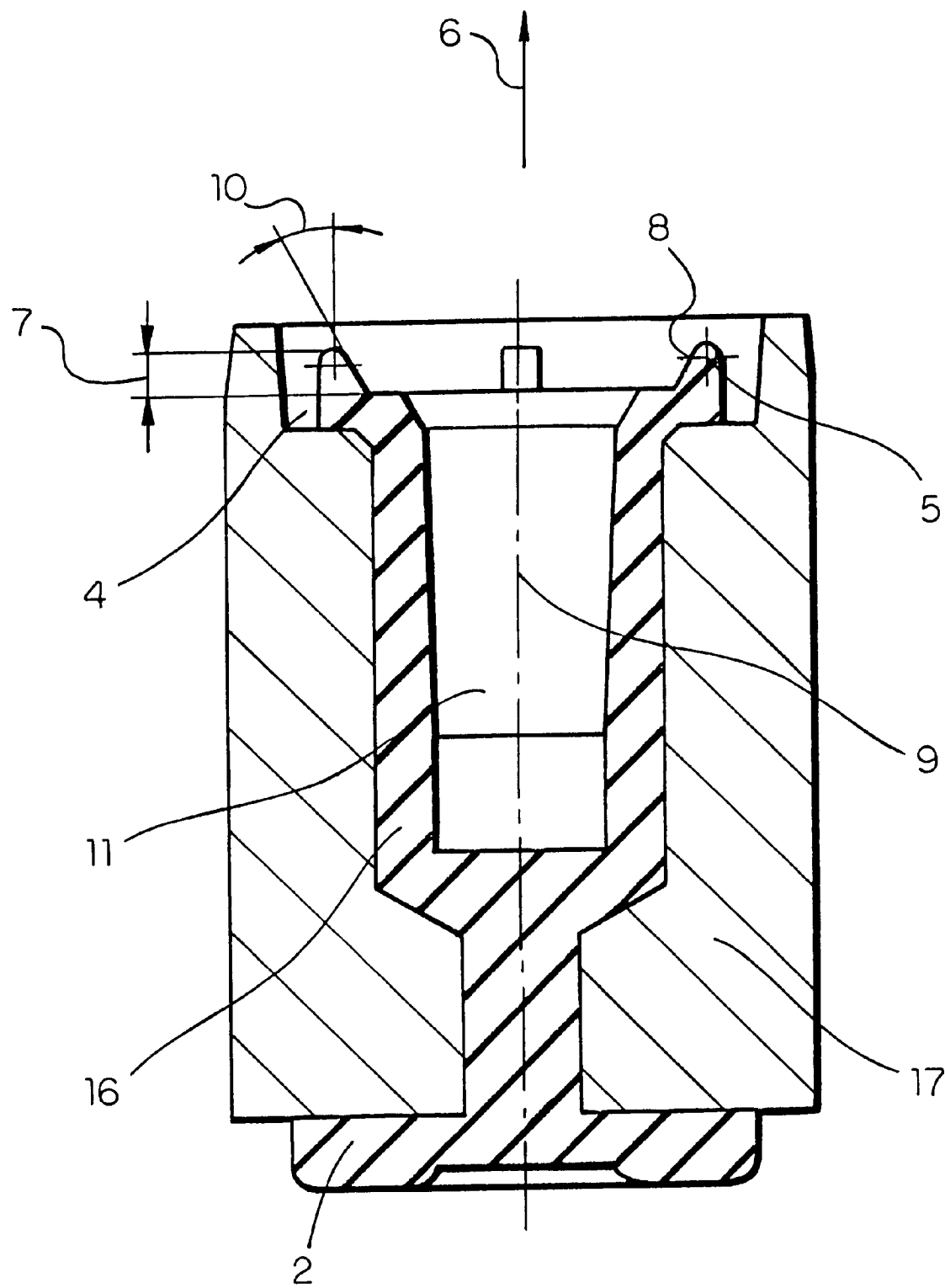
FIG. 2 is a magnified sectional view of the magnet armature shown in FIG. 1.

FIG. 2 provides an enlarged scale sectional view of the magnet armature shown in FIG. 1. In this embodiment, the magnet armature is designed to have rotational symmetry and is made of a rubber-metal part, metal part 17 being essentially a hollow cylinder surrounding rubber part 16 on the outer periphery.

In the illustration shown here, two of four stop buffers 5 are cutaway and one stop buffer 5 is shown in elevation. It can be seen that stop buffers 5 each have a diminishing cross section in the opening direction 6. The material used in this embodiment is FPM. Stop buffers 5 are all identical in design and each has a height 7 of 0.5 mm, with angle 10, formed by inside faces 8 and axis 9, amounting to 25°.

Metal part 17 is provided with central passage 11 which is filled at least partially with the same elastomeric material as that used to make stop buffers 5 and sealing body 2.

Figure 3:
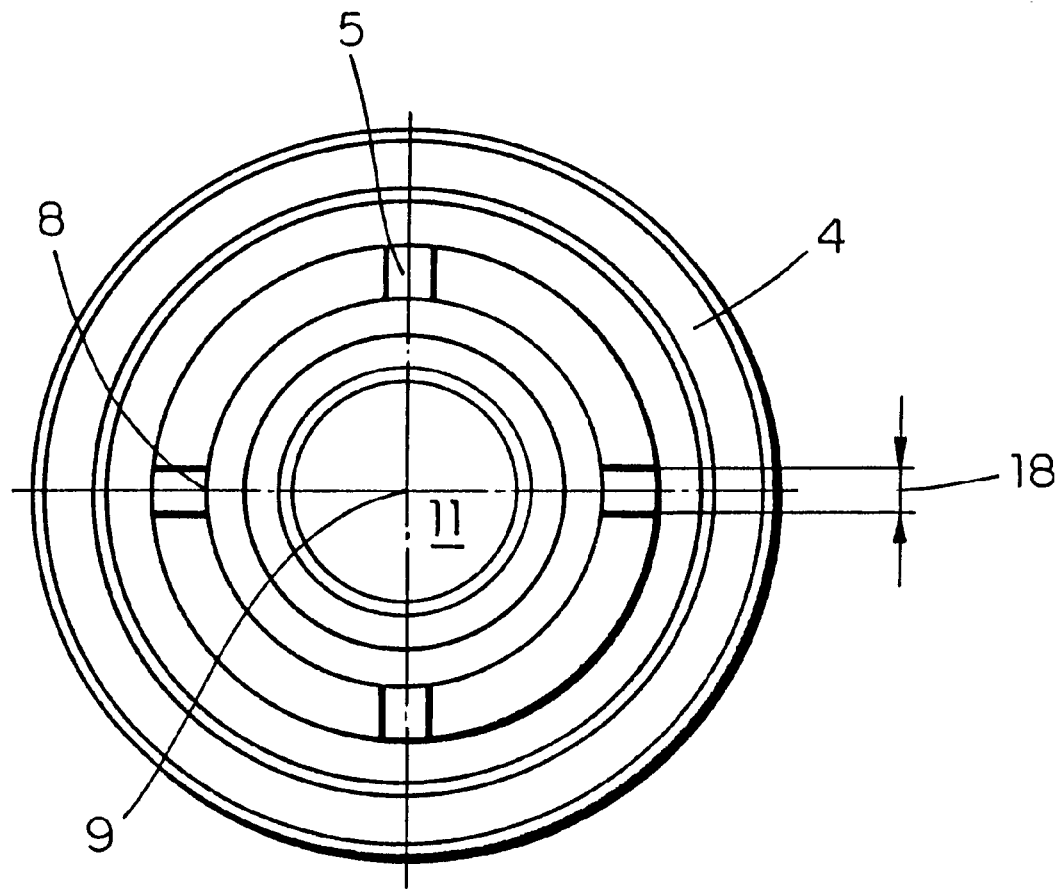
FIG. 3 is a top view of the magnet armature shown in FIG. 2.

FIG. 3 is a top view of the magnet armature from FIG. 2, showing four identical stop buffers 5, each arranged at a distance of 90° from the next. In the peripheral direction, stop buffers 5 have a width 18 corresponding essentially to height 7 of stop buffers 5.

What is claimed is:

1. A magnet armature for an electromagnetically operable valve, comprising:

a sealing body and a valve seat, wherein the sealing body can be brought into engagement with the valve seat to form a seal and movement of the sealing body away from the valve seat defines an opening direction, the sealing body having a first end facing the valve seat and a second end facing the opening direction; and a plurality of stop buffers made of an elastomeric material arranged on the second end of the sealing body, wherein each stop buffer has a cross section which decreases in the opening direction to achieve a progressive spring characteristic.

2. A magnet armature as set forth in claim 1, wherein at least three nub-shaped stop buffers are circumferentially distributed uniformly along the second end of the sealing body.

3. A magnet armature as set forth in claim 1, wherein the stop buffers have a height of 0.1 to 1.5 mm in the opening direction.

4. A magnet armature as set forth in claim 2, wherein the stop buffers have a height of 0.1 to 1.5 mm in the opening direction.

5. A magnet armature as set forth in claim 2, wherein the stop buffers have a cross sectional shape when viewed along a cutting plane that is parallel to the opening direction that has approximately the shape of a truncated pyramid.

6. A magnet armature as set forth in claim 3, wherein the stop buffers have a cross sectional shape when viewed along a cutting plane that is parallel to the opening direction that has approximately the shape of a truncated pyramid.

7. A magnet armature as set forth in claim 5, wherein the stop buffers have an inside surface that form an angle of 10° to 45° with respect to an axis parallel to the opening direction.

8. A magnet armature as set forth in claim 2, further comprising stop buffers that have different heights to achieve a stepwise discontinuous attenuation of the movement of the magnet armature, and at least three stop buffers of the same height distributed uniformly in the peripheral direction.

9. A magnet armature as set forth in claim 8, wherein stop buffers of the same height have the same shape.

10. A magnet armature as set forth in claim 1, further comprising a central passage which extends in the opening direction and which is completely filled with elastomeric material, and wherein the sealing body and the stop buffers are made of the same material and designed in one piece with a smooth transition of the elastomeric material connecting them.

* * * * *